(12) United States Patent
Cheng

(10) Patent No.: US 6,761,373 B2
(45) Date of Patent: Jul. 13, 2004

(54) BASKET SUPPORT OF A STROLLER

(76) Inventor: Pao-Hsien Cheng, No. 139, Jen Yi 1st Street, Jen Te Hsiang, Tainan Hsien (TW)

(*) Notice: Subject to any disclaimer, the term of this patent is extended or adjusted under 35 U.S.C. 154(b) by 0 days.

(21) Appl. No.: 10/229,084

(22) Filed: Aug. 28, 2002

(65) Prior Publication Data

US 2004/0041369 A1 Mar. 4, 2004

(51) Int. Cl.[7] .............................................. B62B 1/00
(52) U.S. Cl. ..................................... 280/647; 280/47.38
(58) Field of Search ................................ 280/647, 648, 280/642, 650, 643, 38, 645, 646, 649, 651, 655, 655.1, 657, 658, 43.1, 43.14, 43.24, 47.17, 47.18, 47.25, 47.38, 47.26

(56) References Cited

U.S. PATENT DOCUMENTS

| 4,191,397 | A | * | 3/1980 | Kassai ......................... 280/647 |
| 4,741,551 | A | * | 5/1988 | Perego ........................ 280/642 |
| 4,923,208 | A | * | 5/1990 | Takahashi et al. ........... 280/642 |
| 4,953,887 | A | * | 9/1990 | Takahashi et al. ........... 280/647 |
| 5,725,238 | A | * | 3/1998 | Huang ........................ 280/642 |
| 6,062,589 | A | * | 5/2000 | Cheng ........................ 280/647 |
| 6,155,592 | A | * | 12/2000 | Hsia ........................... 280/647 |
| 6,241,273 | B1 | * | 6/2001 | Gehr ........................... 280/642 |
| 6,267,406 | B1 | * | 7/2001 | Huang ........................ 280/647 |
| 6,416,076 | B1 | * | 7/2002 | Hou et al. ................... 280/642 |

FOREIGN PATENT DOCUMENTS

JP                01262252 A    * 10/1989    ............. B62B/9/00

* cited by examiner

Primary Examiner—Brian L. Johnson
Assistant Examiner—Hau Phan
(74) Attorney, Agent, or Firm—Rosenberg Klein & Lee

(57) ABSTRACT

A basket support of a foldable stroller includes an U-shaped rod, which has two juxtaposed lateral sections pivoted to respective rear extensions of a seat support of the stroller by use of pivotal blocks. The rod lateral sections and the pivotal blocks are constructed such that the U-shaped rod can only be moved towards, and close to, upper sides of the seat support extensions to a storage position. When the rear wheels of the stroller are detached, and when the stroller is folded to occupy less space in packing, the U-shaped rods are positioned in the folded position to not cause increase of dimensions to the packing case. The lateral sections of the U-shaped rod are substantially parallel with corresponding extensions of the seat support when the stroller is folded, supporting the stroller in upright position together with the rear wheels.

7 Claims, 5 Drawing Sheets

BASKET SUPPORT OF A STROLLER

BACKGROUND OF THE INVENTION

1. Field of the Invention

The present invention relates to a basket support of a stroller, more particularly a stroller basket support, which can be used to support the stroller in upright position together with the rear wheels when the stroller is folded, and which can be folded together with the frame so as not to cause increase of dimensions to a packing case the stroller when the frame is folded to occupy less space in storage.

2. Brief Description of the Prior Art

Foldable strollers are very popular because they can be collapsed into smaller size for easy storage and transportation. The present applicant has disclosed several foldable strollers that are equipped with detachable wheels in patent applications. Such strollers are even more convenient to use because size thereof is significantly reduced when the wheels are detached from the main frame.

However, in strollers disclosed by the present applicant, no attention was paid to making improvement on the basket so that the basket will not hinder reduction of size of the strollers. In some of the strollers, no baskets are provided, while in the rest, the baskets are made to be relatively small in size lest the same interfere with folding of the strollers. Consequently, convenience of the strollers is reduced.

SUMMARY OF THE INVENTION

It is a main object of the present invention to provide a stroller basket support which can be folded together with the frame so as not to cause increase of dimensions of the stroller when the stroller is in folded position.

It is another object of the present invention to provide a stroller basket support, which can be used to support the stroller in upright position together with the rear wheels when the stroller is in folded position.

The present basket support includes an U-shaped rod, which has two juxtaposed lateral sections pivoted to respective rear extensions of a seat support of a stroller by means of pivotal blocks. The juxtaposed lateral sections of the U-shaped rods and the pivotal blocks are constructed such that the U-shaped rod can only be moved towards upper sides of the seat support extensions to a storage position. When the rear wheels of the stroller are detached, and when the stroller is folded to occupy less space in packing, the U-shaped rods are positioned in the folded position to not cause increase of dimensions to the packing case.

BRIEF DESCRIPTION OF THE DRAWINGS

The present invention will be better understood by reference to the accompanying drawings, wherein:

FIG. 6 is a partial side view of the stroller basket support in stretched position according to the present invention.

DETAILED DESCRIPTION OF THE PREFERRED EMBODIMENTS

Figure 1:
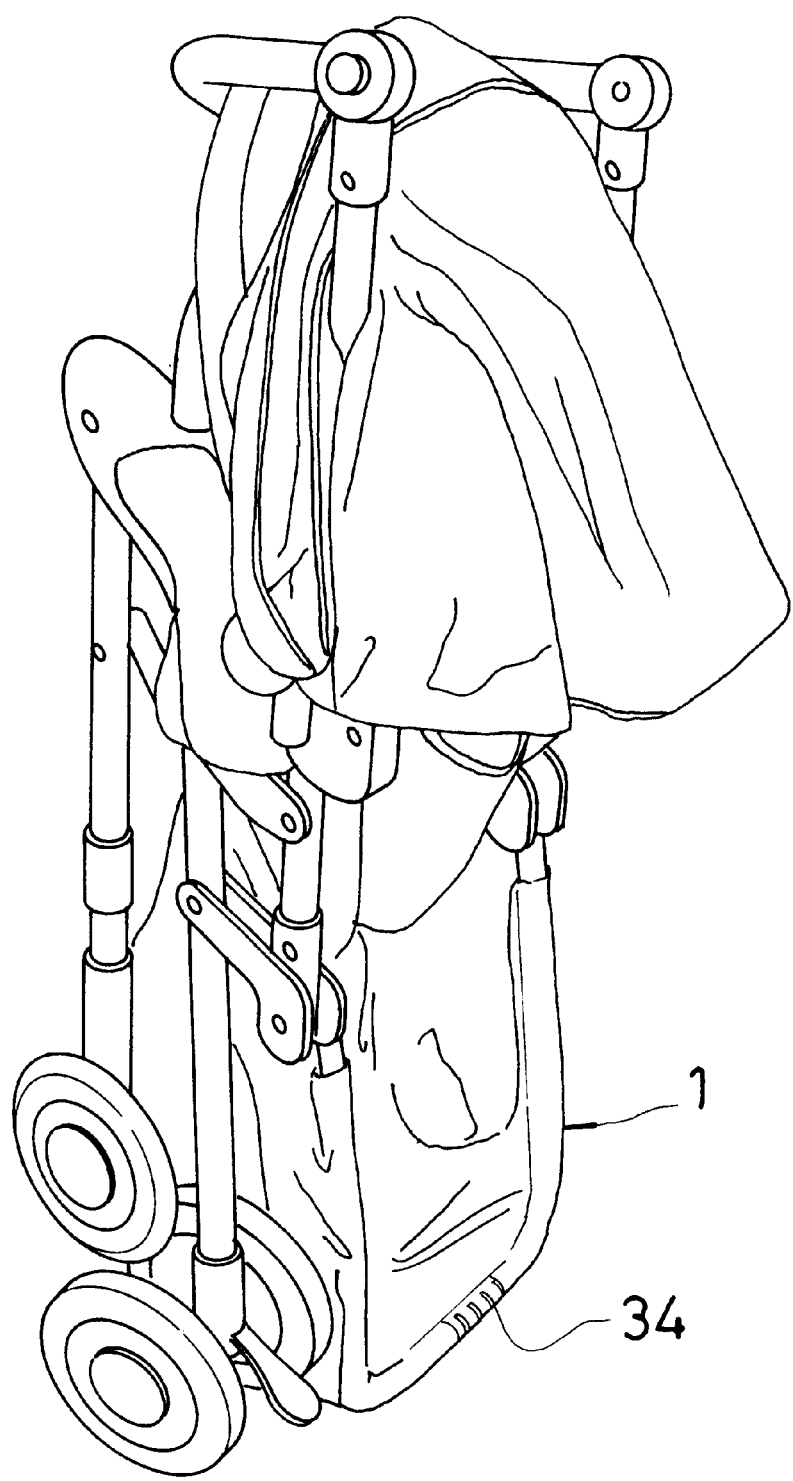
FIG. 1 is a perspective view of the stroller with the basket support of the present invention.
Figure 2:
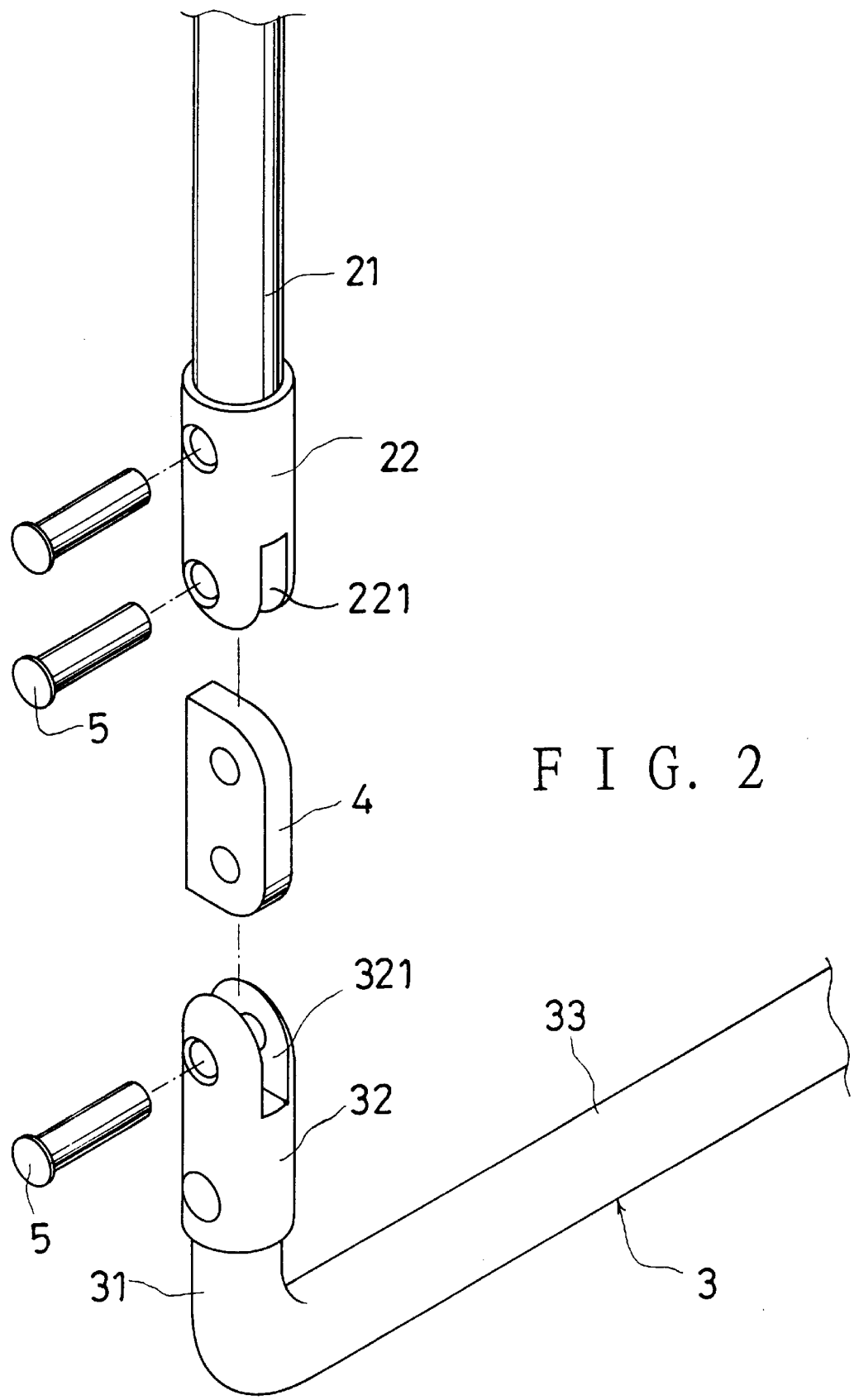
FIG. 2 is a fragmentary exploded perspective view of the stroller basket support of the present invention.

Referring to FIGS. 1, and 2, a basket support of a stroller according to the present invention includes a rod 3, two connecting blocks 32, 32, and two pivotal blocks 4, 4.

The rod 3 has a substantially U shape, and includes a main portion, and two lateral portions 31 extending from a respective one of two ends of the main portion to be substantially parallel to each other.

The pivotal blocks 4 each has first and second ends provided with pivotal holes (not numbered). In addition, each of the pivotal blocks 4 has two round corners at one lateral edge, and two square corners at the opposite lateral edge.

Each of the lateral portions 31 is joined to a respective one of the connecting blocks 32. Similarly, referring to FIG. 2, rear extensions 21 of a seat support of a stroller are each joined to a respective one of two connecting blocks 22, 22. Each of the connecting blocks 22, 32 has a receiving gap 221, 321 formed between two protrusions thereof. The protrusions of the connecting blocks 22, 32 have pivotal holes (not numbered).

In combination, the first and the second ends of the pivotal blocks 4 are passed into corresponding receiving gaps 321, 221, and pivotal pins 5 are passed through the pivotal holes of the pivotal blocks 4 and the pivotal holes of the connecting blocks 32, 22 so that the pivotal blocks 4 pivot on the connecting blocks 32, 22. In other words, the pivotal blocks 4 pivot on the rear extensions 21 of the stroller seat support, and the U-shaped rod 3 pivots on the pivotal blocks 4. In addition, the pivotal blocks 4 are arranged such that the round corners thereof face up when the stroller is in spread in-use position.

Furthermore, referring to FIG. 1, several anti-slip members 34 are joined to the main portion of the U-shaped rod 3 for increasing friction of ground against the U-shaped rod 3 when the U-shaped rod 3 supports the stroller on the ground together with rear wheels of the stroller. The anti-slip members 34 can be made to have a laid-down U shape, and have veins thereon.

Figure 5:
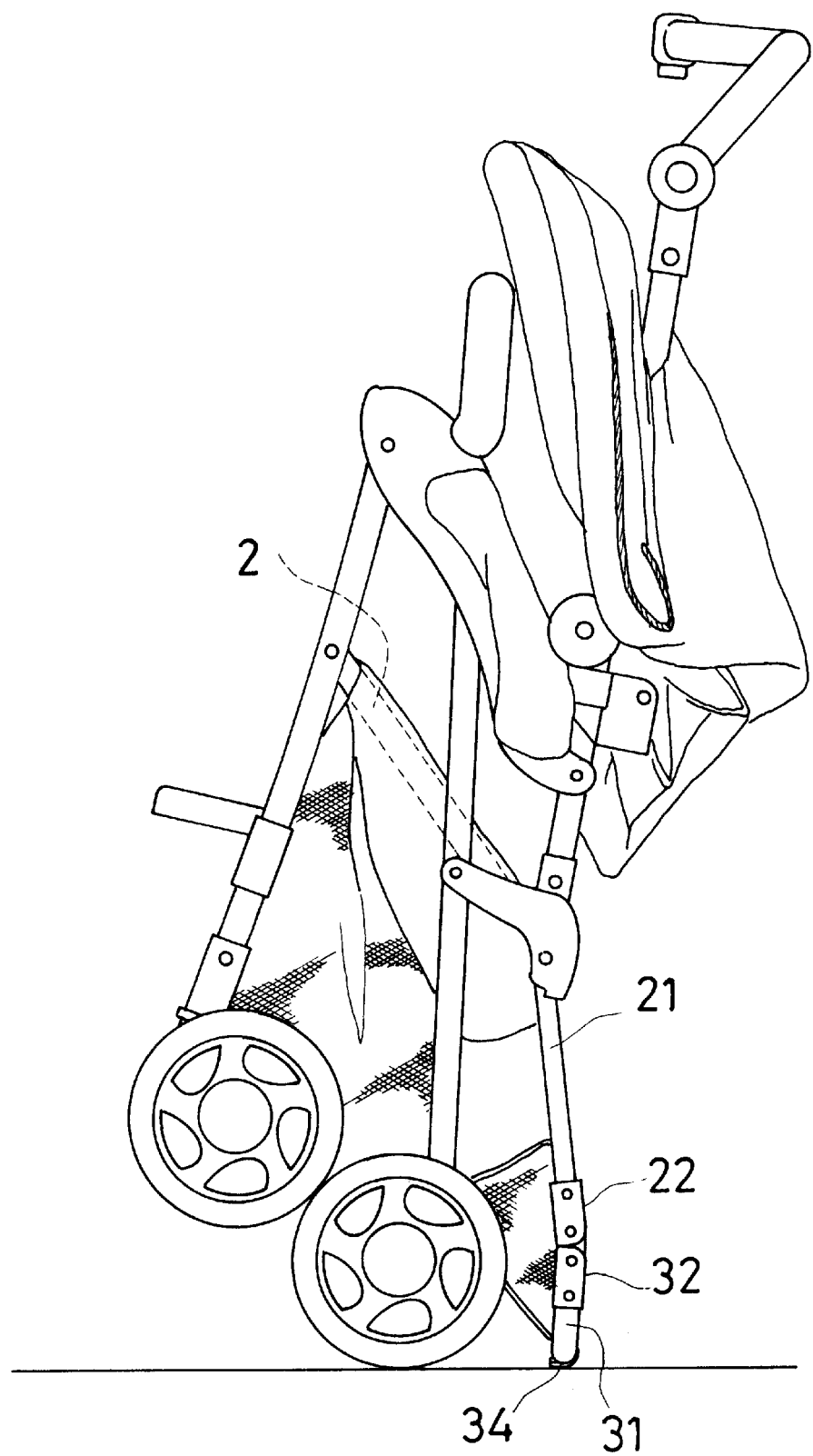
FIG. 5 is a side view of a stroller supported in upright position with rear wheels and the basket support of the present invention.

Referring to FIGS. 5, and 6, when the stroller is in folded position, the U-shaped rod 3 is pivoted away from the rear extensions 21 so that the lateral portions 31 are substantially parallel to corresponding rear extensions 21 to support the folded stroller on the ground together with the rear wheels; the connecting blocks 32, 22 forming an obtuse angle in between; the square corners of the pivotal blocks 4 engaging the connecting blocks 32, 22 to prevent the U-shaped rod 3 from moving closer to the rear wheels.

Figure 3:
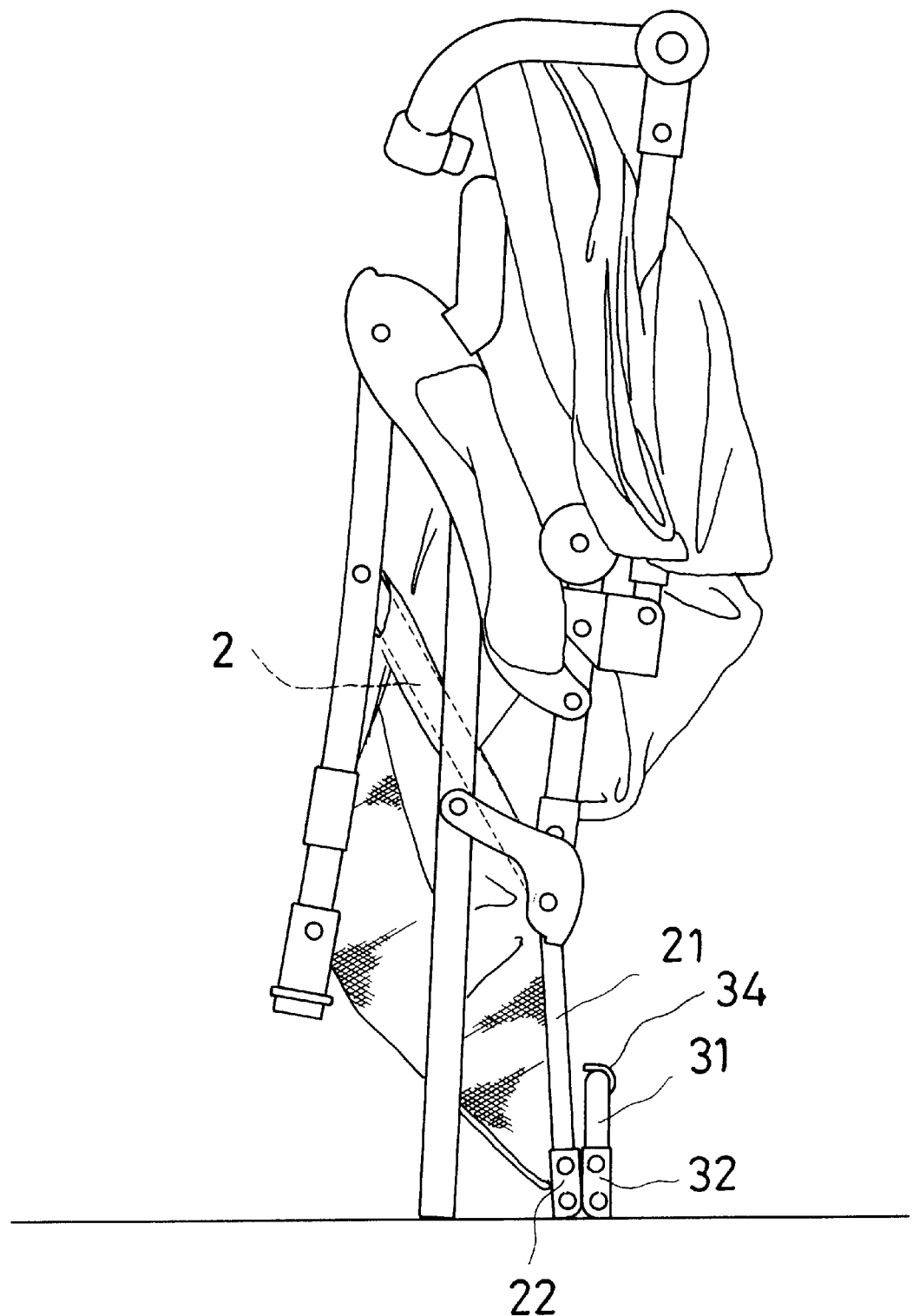
FIG. 3 is a side view of a stroller with rear wheels being detached from it according to the present invention.
Figure 4:
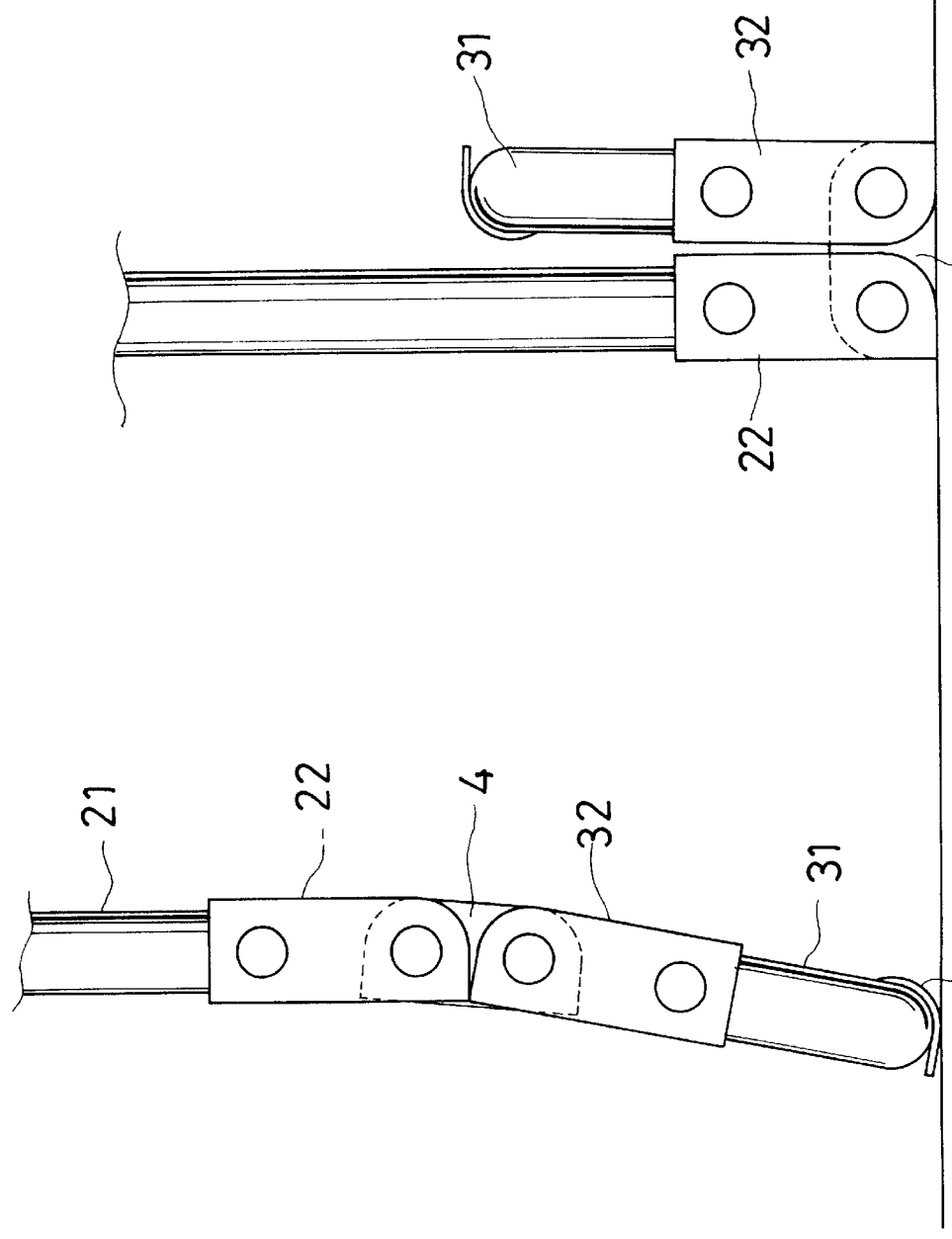
FIG. 4 is a partial side view of the stroller basket support in folded position according to the present invention.

Referring to FIGS. 3, and 4, when the stroller is in folded position, and the rear wheels detached from the stroller frame, the U-shaped rod 3 is pivoted to be closely together with the rear extensions 21 so that the pivotal blocks 4, the rear extensions 21, and the main portion of the rod 3 support the folded stroller on the ground together with the rear wheels support. The anti-slip members 34 help the stroller to be stably supported in the upright position.

From the above description, it can be easily understood that the present basket support of a stroller has advantages as followings:

1. Being connected to both of the rear extensions of the seat support the basket support is relatively big in length, thus allowing a big basket to be connected thereto to provide enough room for containing objects.

2. When the stroller is folded, the basket support can support the stroller stably in upright position together with two rear wheels of the stroller. And, the basket support cannot slip owing to the anti-slip members.

3. When the stroller is folded, and when the rear wheels are detached from the frame of the stroller, and placed in spare space of a packing case used to receive the stroller, the basket support can be pivoted to be closely together with the rear extensions so as not to cause increase of dimensions to the packing case.

What is claimed is:

1. A basket support for a stroller, the basket support being provided for hanging a basket thereon; the basket support being pivoted to two rear extensions of a seat support of the stroller; the basket support being capable of being folded into reduced size together with a main frame of the stroller; the basket support being made in such a manner as to be, when unfolded, capable of supporting the stroller in an upright position together with two rear wheels of the stroller when the main frame is folded, the basket support comprising:

a rod having a substantially U shape; the rod having a main portion, and two lateral portions extending from respective ends of the main portion to be substantially parallel to each other;

two pivotal blocks each having first and second ends;

the U-shaped rod being pivoted on the pivotal blocks with the lateral portions thereof being each pivoted to the first end of a respective pivotal block; the pivotal blocks being each pivoted to a rear end of a corresponding rear extension of the seat support at the second end thereof for allowing the lateral portions to be closely together with the rear extensions by means of pivoting the U-shaped rod on the pivotal blocks plus pivoting the pivotal blocks on the rear extensions.

2. The basket support of a stroller as claimed in claim 1, wherein each of the lateral portions is joined to a connecting block, and each of the rear ends of the seat support is joined to a connecting block; each of the connecting blocks having a receiving gap formed between two protrusions thereof; the first and the second ends of the pivotal blocks being passed into corresponding receiving gaps in the pivotal connection of the pivotal blocks to both the seat support and the U-shaped rod.

3. The basket support of a stroller as claimed in claim 2, wherein the anti-slip members are made to have a laid-down U shape.

4. The basket support of a stroller as claimed in claim 2, wherein the anti-slip members have veins thereon.

5. The basket support of a stroller as claimed in claim 2, wherein the first end of each of the pivotal blocks has a round corner, and a square corner, while the second end of each of the pivotal blocks has a round corner on a corresponding side of the round corner of the first pivotal block, and has a square corner on other side thereof.

6. The basket support of a stroller as claimed in claim 1, wherein a plurality of anti-slip members are joined to the main portion of the U-shaped rod for increasing friction of ground against the U-shaped rod when the U-shaped rod supports the stroller on the ground together with rear wheels of the stroller.

7. A stroller apparatus comprising:

a collapsible main frame;

at least a pair of rear extensions each pivotally coupled to the main frame and having a terminal end portion extending therefrom, the rear extensions being spaced one from the other; and, a basket support pivotally coupled to the terminal end portions of the rear extensions for defining with the rear extensions a support for a basket suspended therefrom, the basket support being pivotally displaceable relative to the rear extensions between extended and reduced positions, the basket support in the reduced position being folded substantially alongside the terminal end portions of the rear extensions.

* * * * *